Figure 3:
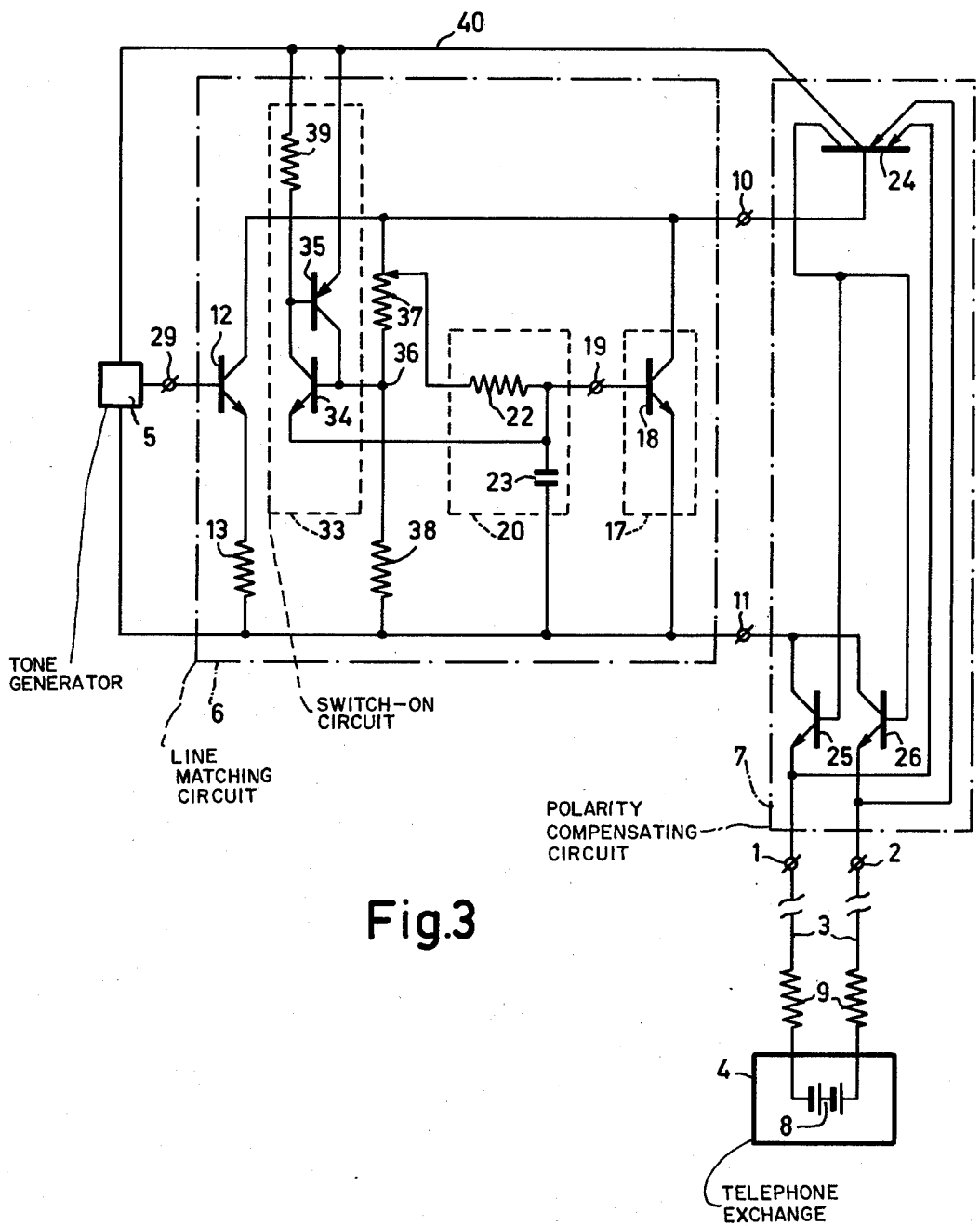

United States Patent [19]

Janssen et al.

[11] B 3,982,078

[45] Sept. 21, 1976

[54] LINE MATCHING CIRCUIT FOR USE IN A TONE PUSHBUTTON DIALLING SUBSCRIBER'S SET PROVIDED WITH A TONE GENERATOR

[75] Inventors: Daniel Johannes Gerardus Janssen; Cornelis Maria Hart, both of Eindhoven, Netherlands

[73] Assignee: U.S. Philips Corporation, New York, N.Y.

[22] Filed: May 22, 1974

[21] Appl. No.: 472,284

[44] Published under the second Trial Voluntary Protest Program on January 13, 1976 as document No. B 472,284.

[30] Foreign Application Priority Data

May 25, 1973 Netherlands.................... 7307296

[52] U.S. Cl. .......................... 179/81 R; 179/84 R
[51] Int. Cl.² ................... H04M 1/50; H04M 1/00
[58] Field of Search............ 179/81 R, 84 R, 84 VF, 179/81 A

[56] References Cited

UNITED STATES PATENTS

| | | | |
|---|---|---|---|
| 3,731,004 | 5/1973 | Coupland | 179/84 T |
| 3,823,272 | 7/1974 | Tabalba | 179/81 A |

Primary Examiner—Kathleen H. Claffy
Assistant Examiner—Joseph Popek
Attorney, Agent, or Firm—Frank R. Trifari; Simon L. Cohen

[57] ABSTRACT

An impedance matching circuit for a pushbutton telephone uses two voltage regulating transistors having their emitter-collector terminals connected in parallel with a potentiometer, the output terminals of the telephone set, and the output of a pushbutton tone generator amplifier. The base terminal of one of the transistors is connected directly to a tap of the potentiometer, while the base of the second transistor is connected to a further tap on the potentiometer through a low pass filter.

5 Claims, 3 Drawing Figures

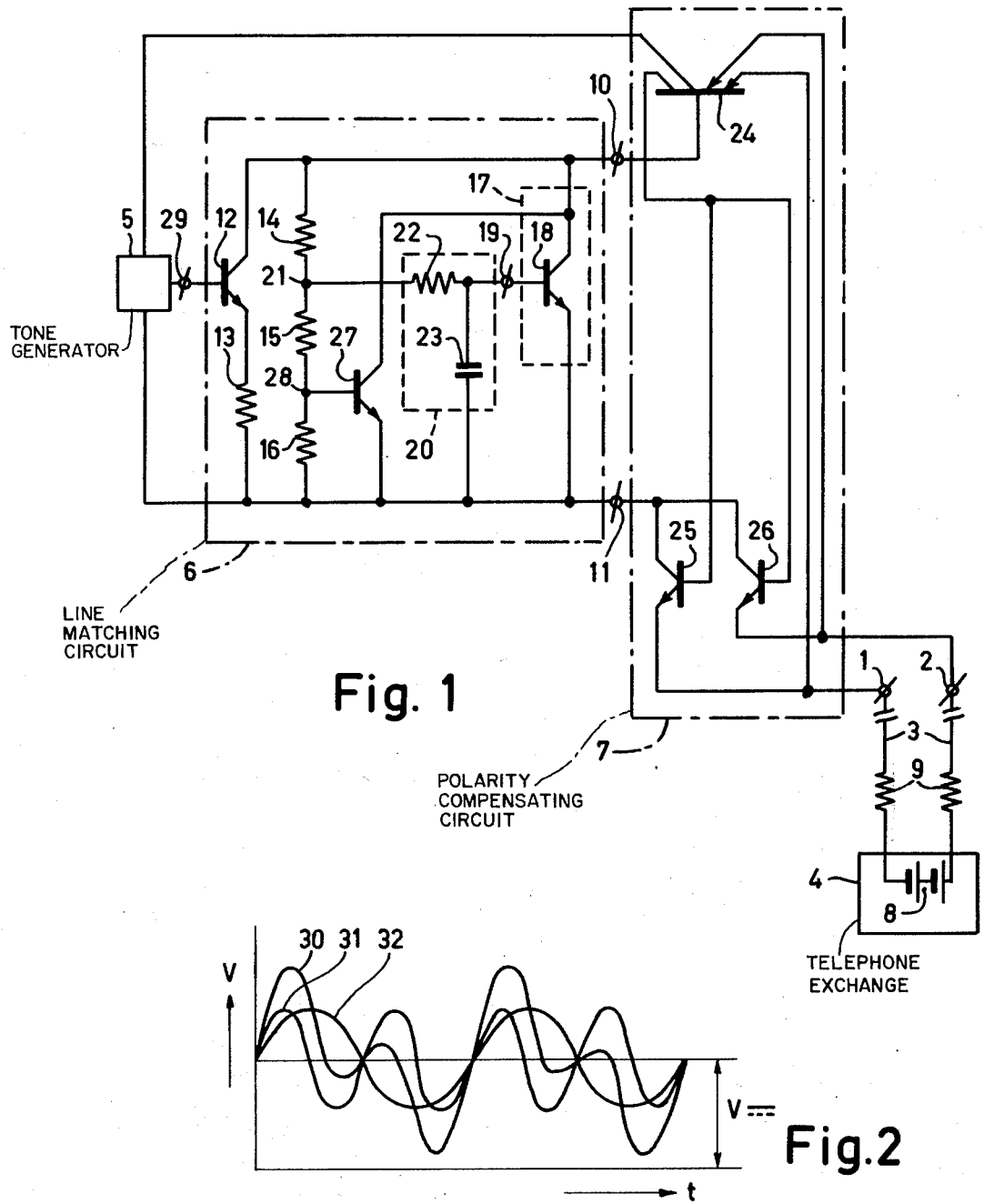

LINE MATCHING CIRCUIT FOR USE IN A TONE PUSHBUTTON DIALLING SUBSCRIBER'S SET PROVIDED WITH A TONE GENERATOR

The invention relates to a line matching circuit for use in a tone pushbutton dialling subscriber's set provided with a tone generator.

A subscriber's set usually is connected to a pair of transmission lines which serves to transmit information, such as speech and tone signals, to be exchanged between the exchange and the subset. This pair of transmission lines is also used to supply direct current to the circuits in the subset. The requirements to be satisfied by the subset circuits are that the alternating voltage impedance shall be equal to the characteristic impedance of the pair of transmission lines and that the direct-current resistance shall have a value such that the voltage drop produced across this resistor by the required minimum line current is at least equal to the supply voltage required for the circuits in the subset. With a given value of the voltage of the supply source in the exchange and a given line resistance per unit length of the line the maximum distance between a subset and an exchange depends only upon the direct-current resistance of the subset circuits. Hence it is of advantage for this direct-current resistance to be as small as possible.

In our co-pending Netherlands Patent Application 7,212,510 corresponding to application Ser. No. 392,753, filed Aug. 29, 1973 a line matching circuit for a subset provided with a tone generator is described in which the series combination of a main current path of a transistor and a resistor is connected between a pair of transmission lines. The control electrode of the transistor is connected to a potentiometer which is included between the pair of transmission lines and determines the alternating-current impedance of the circuit. Thus the direct-current resistance of the circuit is determined by the control voltage and the resistor. This resistor connected in series with the main current path of the transistor also determines the D.C. bias of the transistor. Hence reducing this resistor in order to reduce the direct-current resistance of the circuit results in a reduction of the degree of drive to the transistor. Thus it is no longer possible to produce an alternating-voltage power of the tone signals of the value desired by the telephone authorities with a value of the direct-current resistance as required by these authorities.

It is an object of the present invention to provide a line matching circuit for a subscriber's set provided with a tone generator, which circuit is capable of generating tone signals which have an alternating-current power desired by the authorities and also of providing a direct-current resistance having the low value desired by them.

A line matching circuit in accordance with the invention is characterized in that it has two terminals between which an alternating-current source coupled to the tone generator is connected for providing alternating currents at tone-signal frequencies, and in that there are connected between the terminals a given alternating-voltage impedance and an amplifier the input of which is connected by way of a low-pass filter to a first tap on a potentiometer which also is connected between these terminals.

An embodiment of the invention will now be described, by way of example, with reference to the accompanying diagrammatic drawings in all Figures of which similar reference numbers relate to like parts and in which:

FIG. 1 is a schematic circuit diagram of an arrangement which includes a line matching circuit according to the invention, FIG. 2 is a graph which shows the voltages which occur in the arrangement shown in FIG. 1 as a function of time, and FIG. 3 shows another embodiment of an arrangement which includes the line matching circuit according to the invention.

FIG. 1 shows an arrangement for generating and transmitting, via a pair of transmission lines, dialling tone signals situated in the telephone speech band. The arrangement is connected to line terminals 1 and 2 of a pair of transmission lines 3 which connects the arrangement to a telephone exchange 4.

The arrangement comprises a tone generator 5, a line matching circuit 6 and a circuit 7 for rendering the arrangement insensitive to the polarity of the line voltage.

The tone generator 5 is extensively described in Netherlands Patent Applicaton 7,207,933 corresponding to U.S. Pat. No. 3,832,639, and the circuit 7 for rendering the arrangement insensitive to the voltage polarity of the line is described in Netherlands Patent Application 7,200,294, corresponding to U.S. Pat. No. 3,829,718.

The arrangement shown in FIG. 1 is supplied with power from the exchange 4, a battery 8 representing the supply source in the exchange 4. The direct-current resistances of the pair of transmission lines 3 are shown as resistors 9.

The telephone authorities require that the alternating-current impedance of the arrangement shall have a given value, for example 800 Ohms, such that it is matched to the characteristic impedance of the pair of transmission lines 3.

In respect of the direct-current resistance of the arrangement the general condition applies that the smaller is the value of this resistance, the larger is the possible maximum length of the pair of transmission lines between the subset and the exchange.

The value is limited, however, by the fact that the direct-current resistance must be such that the voltage drop produced across it by the line current has a value which is at least equal to the supply voltage required for the electronic circuit of the arrangement. The authorities have not imposed fixed requirements in respect of this supply voltage, but they advise a supply voltage which is based on the fact that existing subscriber's sets have carbon microphones. These microphones require a direct current of about 2 mA and have an internal resistance of about 120 Ohms so that the direct supply voltage must be about 2.4 volts. Thus the supply voltage for the arrangement must have about this value.

In addition, the authorities desire the largest possible tone signal power to be delivered to the line pair.

The said requirements can simply be satisfied by means of the line matching circuit 6 according to the invention.

For this purpose an alternating-current source comprising the collector-emitter path (hereinafter called the main current path of a transistor) 12 and a resistor 13 is connected between terminals 10 and 11, the control electrode of the transistor 12 being coupled to an output 29 of the tone generator 5. The line is terminated for alternating voltages by an alternating-current impedance of 800 Ohms which comprises resistors 14, 15 and 16 which constitute a potentiometer connected between the terminals 10 and 11. There is further connected between the terminals 10 and 11 an amplifier 17, which in this embodiment is a transistor 18 but, if large current amplification is required, may comprise a plurality of transistors. The input 19 of the amplifier 17, that is the base electrode of the transistor 18, is connected to a first tap 21 on the potentiometer 14, 15 and 16 via a low-pass filter 20.

The low-pass filter comprises a resistor 22 connected between the first tap 21 on the potentiometer 14, 15, 16 and the input 19 of the amplifier 17, and a capacitor 23 connected in parallel with the input of the amplifier 17.

The value of the resistor 14 is made equal to the sum of the values of the resistors 15 and 16, which is 400 Ohms. Thus the value of the direct voltage between the terminals 10 and 11 is determined, for a voltage of 0.7 volts is set up across the base emitter junction of the transistor 18. Neglecting the very small voltage drop across the resistor 22 due to the bias current of the control electrode, the said voltage of 0.7 volt is set up across the resistors 15 and 16 of the potentiometer. The resulting current through the resistors 15 and 16 also flows through the resistor 14. Because the value of this resistor 14 is equal to the sum of the values of the resistors 15 and 16, the direct voltage produced between the terminals 10 and 11 is 1.4 volts. When the voltage between these terminals slowly increases, the voltage at the control electrodes of the transistor 18 also increases so that this transistor draws more current, which is supplied by the supply source 8 via the resistor 9. As a result the voltage drop across the resistor 9 increases to an extent such as to reduce the voltage between the terminals 10 and 11 to 1.4 volts again. The reverse effect is obtained at a slow decrease of the direct voltage between the terminals 10 and 11. This direct voltage is plotted against time in FIG. 2 in which it is designated by the symbol V - - - - - -.

Between the line terminals 1 and 2 and the terminals 10 and 11 a circuit 7 comprising a multi-emitter transistor 24 and transistors 25 and 26 is connected which enables the arrangement to operate independently of the polarity of the line voltage. When the line terminal 1 is positive with respect to the line terminal 2 that emitter base junction of the transistor 24 which is connected to the terminal 1 is connected in the forward biassing direction, and because the emitter of the transistor 26 is connected to the line terminal 2 this transistor 26 also conducts, being driven into saturation. When the line terminal 2 is positive with respect to the line terminal 1 the same applies to the other base-emitter junction of the transistor 24 and to the transistor 25. Consequently a voltage of 0.7 volts is set up across one of the emitter base junctions of the transistor 24, the voltage drop across the transistor 25 or 26 driven into saturation being about 0.2 volts. Having regard to the voltage of 1.4 volts set up between the terminals 10 and 11 the arrangement requires a D.C. voltage of only 2.3 volts between the line terminals 1 and 2, which corresponds to the value of the direct-voltage supply required for a carbon microphone which may be connected between these terminals.

The operation of the line matching circuit 6 for the tone signals generated by the tone generator 5 is as follows.

The direct-current bias of the transistor 12 is chosen so that it slightly exceeds the peak value of the desired alternating current, which is achieved by a suitable choice of the control voltage and of the values of the resistors. When after the transient phenomenon of the tone generator 5 the base current supplied by this generator 5 to the base of the transistor 12 increases, this transistor 12 will draw an increased amount of collector current. This additional current is supplied to the transistor 12 by the battery 8 by way of one of the line resistances 9, the line terminal 1 and the transistor 24, and returns to the battery 8 by way of one of the transistors 25, 26 and the other line resistance 9. This additional current causes an increase of the voltage drop across the line resistances 9, so that the voltage between the line terminals 1 and 2, and consequently the voltage between the terminals 10 and 11 decreases. When the tone generator 5 reduces the base current of the transistor 12, the collector emitter current and consequently the voltage drop across the line resistances 9 also decrease. As a result the voltage between the terminals 10 and 11 is increased so as to exceed the voltage of 1.4 volts determined by the transistor 18. The variations of the base currents supplied by the tone generator 5 to the base of the transistor 12 are sinusoidal and have signal frequencies which are rejected by the low-pass filter 20. Thus the control of the transistor 18 is not affected by these tone signals, preventing the transistor 18 from influencing the alternating-voltage variations between the terminals 10 and 11.

FIG. 2 shows by way of example an alternating voltage signal 30 which is applied to the terminals 10 and 11 and is superposed on the direct voltage of 1.4 volts and forms the sum signal of two tone signals 31 and 32 generated by the generator. To prevent non-linear distortion the arrangement is such that the transistor 12 cannot be driven into its cut-off range.

Because the base emitter junction of a transistor has a non-linear nature, in order to prevent non-linear distortion the transistor 12 is driven through a limited portion of its range and is provided with negative feedback by the voltage across the resistor 13.

Hence the maximum amplitude of the composite tone signals set up between the terminals 10 and 11 is about 1.1 volts, which corresponds to an effective voltage of 0.78 volt. Thus the power generated by a tone signal across a line impedance of about 800 ohms is about 0.2 milliwatts, which corresponds to the value desired by the authorities.

It will be clear from the above that the use of the line matching circuit shown in FIG. 1 enables a tone push-button dial subscriber's set equipped with a tone generator to be operated with a very low D.C. voltage while the tone signal power generated is sufficient for selection.

Owing to the use of the low-pass filter 20 the arrangement is not protected against those interference signals on the line which show rapid variations and high amplitudes. To obviate this disadvantage a transistor 27 is provided, the main current path of which is connected in parallel with the main current path of the transistor 18 and the control electrode of which is connected to a second tap 28 provided on the potentiometer between the resistors 15 and 16. The values of the resistors 15 and 16 are for example 250 ohms and 150 ohms respectively. The transistor 27 is conducting when the voltage at the second tap is at least equal to the base emitter threshold voltage of 0.7 volts. With the aforementioned values of the resistors 14, 15 and 16 this will be the case when the voltage between the terminals 10 and 11 exceeds 3.7 volts. This value is chosen so as to be greater than the peak value of 2.8 volts of the tone signal voltages.

Owing to the provision of the amplifier 17 connected to the low-pass filter 20 the time constant of the low-pass filter is increased by a multiplication factor equal to the amplification factor of said amplifier 17. Apart from the resulting improved operation of the low-pass filter the large time constant has the disadvantage that the switch-on time of the line matching circuit corresponds to it.

In order to obviate this disadvantage the line matching circuit is provided with a switch-on circuit 33 which is shown in FIG. 3. The switch-on circuit includes a thyristor comprising complementary transistors 34 and 35. The base of the transistor 34, which forms the gate of the thyristor, is connected to a tap 36 on a voltage divider comprising resistors 37 and 38. This voltage divider has a resistance of 800 ohms which forms the alternating-current impedance of the line matching circuit. Furthermore the collector of the transistor 34 is connected via a resistor 39 and a conductor 40 to one of the input terminals 1 and 2 while the emitter, which forms the cathode of the thyristor, is connected to the terminal 19. The complementary transistor 35 has its base connected to the collector of the transistor 34, its emitter, which forms the anode of the thyristor, to the conductor 40 and its collector to the base of the transistor 34. The operation of a thyristor is known and hence will not be described more fully.

The operation of the switch-on element 33, with the capacitor 23 uncharged or partly charged, is as follows. When the circuit arrangement is switched on the voltage between the terminals 10 and 11 and hence the base-emitter voltage of the transistor 34 will rise rapidly, because this base-emitter voltage is equal to the voltage between the terminals 10 and 11 less any voltage which may be produced across the capacitor 23 by a residual charge. When this base-emitter voltage is exceeded the thyristor 34, 35 becomes conductive, whereupon the capacitor 23 is rapidly charged by nearly the entire line current via the conductor 40 and the thyristor 34, 35. The rising voltage across the capacitor 23 causes the voltage between the conductor 40 and the terminal 19, i.e. the voltage across the thyristor, to fall rapidly below the extinction voltage of the thyristor. The line matching circuit then is in the operative state.

It should be mentioned that the thyristor 34, 35 also performs the function of the transistor 27 of FIG. 1. The potentiometer tap connected to the resistor 22 is shown in the highest position in this embodiment.

What is claimed is:

1. Line matching circuit for matching the impedance of a tone generator in a subscriber's pushbutton dialling set with a transmission line connected thereto, comprising two terminals, means for coupling said two terminals to said transmission line, a signal controlled alternating-current source means coupling the tone generator to said two terminals for supplying alternating currents at tone signal frequencies thereto, a potentiometer connected between said terminals, a low-pass filter having its input connected to a first tap on said potentiometer and its output connected to the input of an amplifier, the output of said amplifier being connected between the terminals to control the amplitude of slowly varying DC currents flowing through said transmission line in order to maintain a constant DC voltage across said terminals.

2. Line matching circuit as claimed in claim 1, wherein the low-pass filter comprises a resistor connected between the first tap on the potentiometer and the input of the amplifier and a capacitor connected in parallel with the input of the amplifier.

3. Line matching circuit as claimed in claim 1, wherein the potentiometer resistance constitutes the given alternating-voltage impedance.

4. Line matching circuit as claimed in claim 1, further comprising a second amplifier the output of which is connected in parallel with the output of the first amplifier and the input of which is connected to a second tap on the potentiometer to control the amplitude of rapidly varying currents flowing through said transmission line in order to reduce the amplitude of rapidly varying noise signals tending to exceed the amplitude of tone signals from said alternating current source means.

5. Line matching circuit as claimed in claim 2, further comprising a switch-on circuit including a thyristor connected in series with the capacitor between said terminals, said thyristor having its cathode connected to the input of the amplifier and its gate connected to a third tap on the potentiometer.

* * * * *